(12) United States Patent
Fouquet et al.

(10) Patent No.: US 8,087,733 B2
(45) Date of Patent: Jan. 3, 2012

(54) BRAKING ENERGY RECOVERY SYSTEM FOR A VEHICLE AND VEHICLE EQUIPPED WITH THE SAME

(75) Inventors: Dany Fouquet, Montréal (CA); Benoit Lacroix, Montréal (CA); David Arsenault, Montréal (CA)

(73) Assignee: Développement Effenco Inc., Montréal, Québec (CA)

( * ) Notice: Subject to any disclaimer, the term of this patent is extended or adjusted under 35 U.S.C. 154(b) by 353 days.

(21) Appl. No.: 12/330,976

(22) Filed: Dec. 9, 2008

(65) Prior Publication Data
US 2010/0141024 A1 Jun. 10, 2010

(51) Int. Cl.
*B60T 8/64* (2006.01)
*B60T 8/32* (2006.01)

(52) U.S. Cl. ............ 303/152; 303/121; 303/10; 303/11; 303/15

(58) Field of Classification Search .................. 303/152, 303/121, 10, 11, 15, DIG. 11; 180/350
See application file for complete search history.

(56) References Cited

U.S. PATENT DOCUMENTS

| | | | |
|---|---|---|---|
| 3,104,528 A * | 9/1963 | Horig | 60/426 |
| 4,132,283 A | 1/1979 | McCurry | |
| 4,354,400 A | 10/1982 | Baker | |
| 4,778,020 A | 10/1988 | Hagin et al. | |
| 4,959,962 A | 10/1990 | Hagin et al. | |
| 5,839,889 A | 11/1998 | Folsom et al. | |
| 7,597,172 B1 | 10/2009 | Kovach et al. | |
| 7,913,791 B2 | 3/2011 | Rose et al. | |
| 2006/0000208 A1 | 1/2006 | Teslak et al. | |
| 2006/0021456 A1* | 2/2006 | Hughes | 74/340 |
| 2006/0108860 A1 | 5/2006 | Stragier | |
| 2006/0196710 A2* | 9/2006 | Banginski et al. | 180/65.2 |
| 2007/0182245 A1 | 8/2007 | DuCharme | |
| 2008/0032842 A1* | 2/2008 | Johnson et al. | 475/5 |
| 2008/0042489 A1* | 2/2008 | Lewis et al. | 303/152 |
| 2008/0174174 A1* | 7/2008 | Burns et al. | 303/152 |
| 2009/0127011 A1 | 5/2009 | Zhang | |

FOREIGN PATENT DOCUMENTS

| | | |
|---|---|---|
| CA | 2582061 | 5/2008 |
| CN | 101332774 | 12/2008 |
| DE | 2551580 | 5/1977 |

(Continued)

OTHER PUBLICATIONS

Eaton: Roadranger, "Eaton Hybrid Power: A breath of fresh air in the commercial vehicle industry", Brochure from Eaton Corporation and Dana Corporation, 2008.

(Continued)

*Primary Examiner* — Bradley King
*Assistant Examiner* — Mahbubur Rashid
(74) *Attorney, Agent, or Firm* — Bereskin & Parr

(57) ABSTRACT

A braking energy recovery system adapted for use on a vehicle and a vehicle having such a system installed. The vehicle has an engine-transmission assembly, a driveshaft, a braking system and an auxiliary system. The energy recovery system comprises a first pump, a hydraulic accumulator and a hydraulic motor. The first pump is a variable displacement hydraulic pump. The hydraulic accumulator is connected to the first pump and is operative to store hydraulic fluid under pressure. The hydraulic motor is hydraulically connected to the accumulator to receive hydraulic fluid. The motor is adapted to drive a second hydraulic pump, which is hydraulically connected to the auxiliary system, using hydraulic energy stored in the accumulator.

17 Claims, 2 Drawing Sheets

FOREIGN PATENT DOCUMENTS

| | | |
|---|---|---|
| DE | 3235825 | 3/1984 |
| EP | 0047643 A1 * | 3/1982 |
| EP | 94664 | 5/1983 |
| EP | 0140046 | 9/1984 |
| EP | 650419 | 7/1993 |
| EP | 1733910 | 6/2006 |
| EP | 2233646 | 12/2009 |
| FR | 2613016 | 3/1987 |
| JP | 2117438 | 5/1990 |
| WO | 2006038968 | 7/2005 |
| WO | 2006079179 | 1/2006 |
| WO | WO2006066156 | 6/2006 |
| WO | 2009001001 | 2/2009 |
| WO | 2010087893 | 8/2010 |

OTHER PUBLICATIONS

Hydraulic Launch Assist (HLA), Internet page http://www.eaton.com/EatonCom/ProductsServices/Hybrid/SystemsOverview/HydraulicHLA/index.htm.

EPA, Eaton and Partners Developing Full Diesel-Hydraulic Series Hybrid for UPS, Feb. 10, 2005, Internet page http://www.greencarcongress.com/2005/02/epa_eaton_and_p.html.

Eaton and Peterbilt to Produce Hydraulic Hybrids, Oct. 20, 2004, Internet page http://greencarcongress.com/2004/10/eaton_and_peter.html.

Parker Hannifin Introduces Heavy-Duty Hydraulic Hybrid System, Apr. 7, 2006, Internet page http://www.greencarcongress.com/2006/04/parker_hannifin.html.

Grading & Excavation Contractor, "Parker Hannifin Rolls Out its RunWise Energy Recovery Drive System at Waste Expo 2006", Apr. 6, 2006, Internet page: http://www.gradingandexcavation.com/gx_news_042806_parker.html.

AusIndustry, Success Story, Permo-Drive Technology Pty Ltd, "A cleaner, greener energy solution for heavy transport", Apr. 2003.

The Technology: Permo-Drive Technologies Ltd, Internet page: http://www.permo-drive.com/tech/index.htm.

Rexroth Bosch Group, Conserve Energy—Reduce Costs HRB Hydrostatic Regenerative Braking System from Rexroth, Brochure from Bosch Rexroth Corporation, Hydraulics, Apr. 2008.

Caddet, "Harnessing braking energy with a regenerative energy management system", Brochure from Caddet Energy Efficiency, Mar. 2002.

International Search Report of corresponding PCT application No. PCT/CA2009/001747.

Renova, World's First Hybrid Refuse Collection Truck Launched in Gothenburg, Press Release, Apr. 7, 2008, pp. 1-3.

World's First Hybrid Garbage Truck, Internet Excerpt, pp. 1-5.

* cited by examiner

BRAKING ENERGY RECOVERY SYSTEM FOR A VEHICLE AND VEHICLE EQUIPPED WITH THE SAME

FIELD OF THE INVENTION

The present invention generally relates to the field of energy efficiency in vehicles. More specifically, the present invention relates to a braking energy recovery system for use on vehicles having auxiliary systems, the energy recovery system being able to power at least partially the auxiliary systems.

BACKGROUND OF THE INVENTION

Braking energy recovery systems, also known as hybrid systems, have been known for a while in the field of electric vehicles such as cars and light trucks. In most of these applications, the energy recovered during braking, which would otherwise be dissipated as heat, is reused to drive the vehicle from a stop.

Refuse trucks are very well suited to the application of braking energy recovery systems. Indeed, the typical duty cycle of a refuse truck in collection mode is characterized by a high frequency of stop and go cycles and a low average speed. Furthermore, the energy consumption required by the frequent use of hydraulic auxiliary systems, such as the garbage compactor, is very high, reaching close to 40% in collection mode.

The "HRB Hydrostatic Regenerative Braking System™" from Rexroth, the "Runwise™" from Parker and the "Hydraulic Launch Assist™" from Eaton Corporation all use a combined hydraulic pump-motor. They are all designed for heavy truck applications where braking energy is recovered, stored and reused to launch the vehicle.

The Australian company Permo-Drive is active in the development of parallel hydraulic re-launch systems. Its product, named "Regenerative Drive Shaft" is a concentric pump/motor assembly placed around the vehicle's driveshaft that performs in pump mode to recover braking energy, and performs in motor mode to assist during acceleration from a stop.

Systems for assisting the vehicles during re-launch are however rather complex as they need to interface at different levels with the vehicle's drivetrain. Hence, an interesting alternative is to reuse the stored braking energy to power the auxiliary systems of vehicles making a large use of it, such as refuse trucks.

Different solutions have been proposed that recover the braking energy to power the auxiliary systems of a vehicle. United-States patent application no. US 2006/0108860 to Stragier describes a braking energy recovery system for refuse trucks that reuse the energy to power the auxiliary systems. However, the recovery system is not capable of adequately modulating the braking because its control acts basically as an ON/OFF switch.

United-States patent no. U.S. Pat. No. 4,778,020 to Hagin et al. describes a braking energy recovery system capable of storing braking energy in an accumulator to either drive a vehicle from a stop or to power its auxiliary systems. However, this recovery system requires the use of a complex variable transmission rather than a standard transmission, which limits the potential of use of this recovery system to retrofit existing vehicles.

There is therefore a clear need for an improved braking energy recovery system.

SUMMARY OF THE INVENTION

It is an object of the present invention to provide a braking energy recovery system that overcomes or mitigates one or more disadvantages of known braking energy recovery systems, or at least provides a useful alternative.

The invention provides the advantages of presenting a relatively simple architecture making it both easily retrofitted to existing vehicles such as refuse trucks, or installed on new vehicles as original equipment. Moreover, one embodiment of the present invention provides the advantage of being flexible in the way it uses the recovered braking energy.

In accordance with an embodiment of the present invention, there is provided a braking energy recovery system adapted for use on a vehicle having an engine-transmission assembly, a driveshaft, a braking system and an auxiliary system. The energy recovery system comprises a first pump, a hydraulic accumulator and a hydraulic motor. The first pump is a variable displacement hydraulic pump. The hydraulic accumulator is connected to the first pump and is operative to store hydraulic fluid under pressure. The hydraulic motor is hydraulically connected to the accumulator to receive hydraulic fluid. The motor is adapted to drive a second hydraulic pump using hydraulic energy stored in the accumulator. Optionally, the motor may be a variable displacement hydraulic motor.

In accordance with another embodiment of the invention, there is provided a vehicle equipped with a braking energy recovery system. The vehicle has an engine-transmission assembly, a driveshaft, a braking system and an auxiliary system. The energy recovery system of the vehicle comprises a first hydraulic pump, a hydraulic accumulator, a hydraulic motor and a second hydraulic pump. The first pump is a variable displacement hydraulic pump. The hydraulic accumulator is connected to the first pump and is operative to store hydraulic fluid under pressure. The hydraulic motor is hydraulically connected to the accumulator to receive hydraulic fluid. The second hydraulic pump is mechanically connected to the motor and is hydraulically connected to the auxiliary system.

Optionally, the motor may be a variable displacement hydraulic motor and the second pump may be a fixed displacement pump.

BRIEF DESCRIPTION OF DRAWINGS

These and other features of the present invention will become more apparent from the following description in which reference is made to the appended drawings wherein.

DETAILED DESCRIPTION OF THE INVENTION

The present invention relates to a braking energy recovery system that may be provided as standard equipment on new vehicles as well as retrofitted to existing vehicles. Through the use of variable displacement hydraulic pump and motor, it is possible to modulate the energy recovered as a function of a braking demand and to modulate the energy restored as a function of a power demand from an auxiliary system. Moreover, in one embodiment of the invention, the braking energy recovery system may also be used for assisting the vehicle during acceleration.

Figure 1:
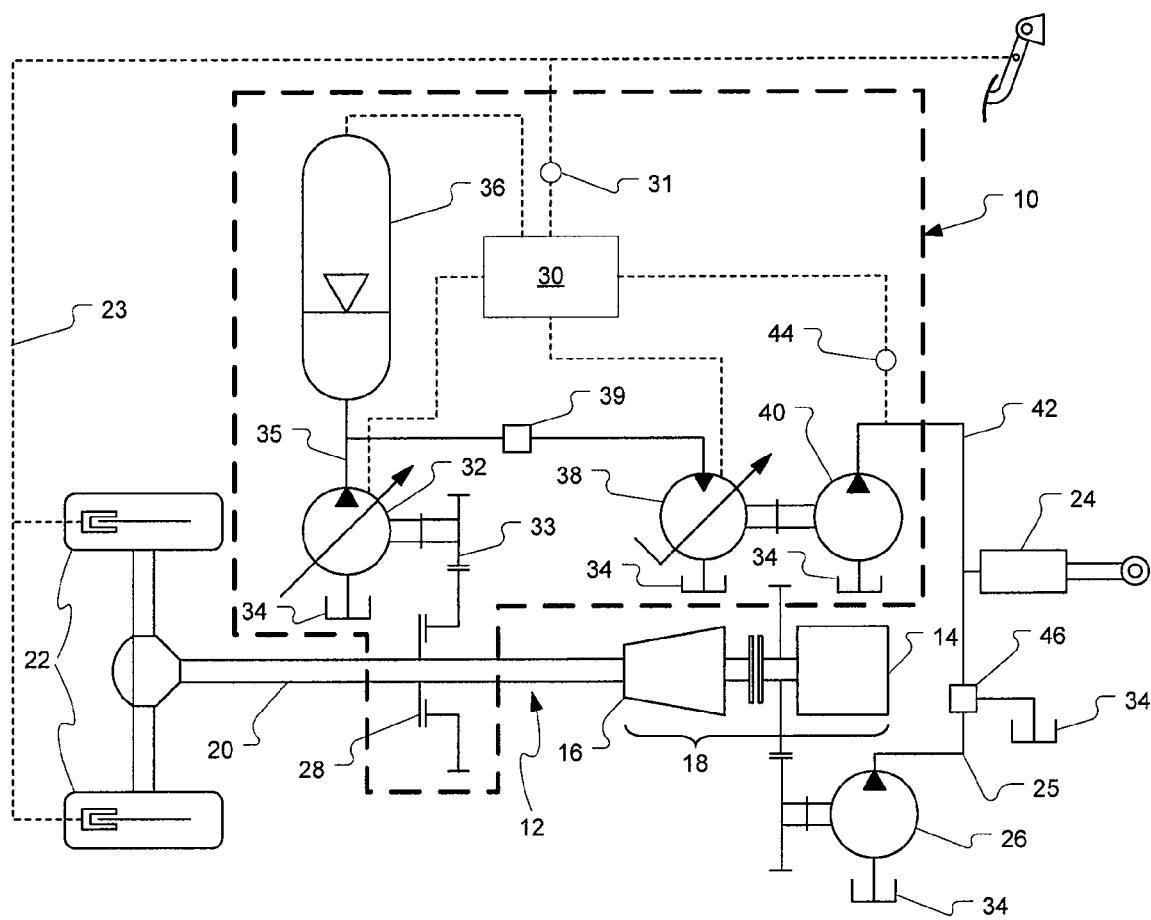
FIG. 1 is a schematic view of a braking energy recovery system in accordance with an embodiment of the present invention.

FIG. 1, now referred to, schematically depicts the braking energy recovery system 10 of the present invention. For a better understanding, the braking energy recovery system 10 is shown installed on a powertrain 12 of a vehicle. The components of the powertrain 12 shown in FIG. 1 are an internal combustion engine 14 and a transmission 16, together forming an engine-transmission assembly 18, and a driveshaft 20 connecting a wheel set 22 to the transmission 16. The wheel set 22 is equipped with brakes connected to a braking system 23. Auxiliary system 24 is connected through a hydraulic connection line 25 to an auxiliary hydraulic pump 26, which is mechanically driven by the powertrain 12. Auxiliary system 24 is often provided on vehicles such as refuse trucks, to which the braking energy recovery system 10 will most often be installed. Such auxiliary system 24 may be any hydraulically powered piece of equipment, such as a garbage compactor, hydraulic arm to lift a garbage can, or other hydraulically powered equipment.

The braking energy recovery system 10 uses a clutch 28 that is adapted to selectively engage the driveshaft 20 to a variable displacement hydraulic pump 32. A controller 30 controls the engagement of the clutch 28. The controller 30 may be an electric, electronic, hydraulic or pneumatic circuit. When the clutch 28 is engaged to the driveshaft 20, the rotation movement of the wheel set 22 drives the variable displacement pump 32. Optionally, a gearbox 33 may be used between the driveshaft 20 and the variable displacement hydraulic pump 32 to increase its speed. Preferably, the gearbox 33 is located between the clutch 28 and the variable displacement hydraulic pump 32 and mechanically connects them.

Through a hydraulic connection 35, the variable displacement pump 32 may pump a hydraulic fluid from a reservoir 34 into a pressurized hydraulic accumulator 36. The accumulator 36 is used to store the hydraulic fluid under pressure. The pressure is created inside the accumulator 36 by a pressurized gas on an opposed side of a piston or membrane from the hydraulic fluid.

Although theoretically, the clutch 28 could be engaged with the driveshaft 20 as soon as the controller 30 detects a braking demand of the braking system 23 using a braking demand sensor 31, it is preferable that the controller 30 rather controls the displacement of the variable displacement pump 32. Indeed, the time lag between the detection of the braking demand and the clutch 28 engagement is longer than the time lag for varying the displacement of the variable displacement pump 32 from zero to a desired value. The controller 30 therefore engages the clutch 28 permanently in the range of speeds typically used for garbage pick-up, which is usually below approximately 40 km/h and varies the displacement of the variable displacement pump 28. Above that speed, the controller 30 may decide to disengage the clutch 28 from the driveshaft 20 to prevent some components, such as the variable displacement pump 32, to exceed its rated maximum rotational speed.

Since the variable displacement pump 32 is driven by the wheel set 22, a resistance is created when the controller increases the displacement of the variable displacement pump 32. This opposes the rolling movement of the wheel set 22, thereby assisting its braking. The larger the flow rate of hydraulic fluid pumped by the variable displacement pump 32, the larger the assistance to the braking of the wheel set 22. The controller 30 matches the braking demand by carefully combining the braking effort from a standard braking system of the vehicle with the braking assistance provided by the braking energy recovery system as it stores energy. Advantageously, the variable displacement pump 32 is sized according to the maximum braking torque it has to apply on the wheel set 22. The controller 30 may then modulate the displacement of the variable displacement pump 32 so as to maximize the level of braking assistance to the braking system, without neither exceeding the braking demand nor the capacity of the accumulator 36. This not only allows decreasing wear of the braking system 23, but also allows maximizing the braking energy stored in the accumulator 36. The controller 30 takes into account the capacity of the accumulator 36 and may therefore decrease the level of braking assistance in accordance with the storage availability of the accumulator 36. Hence, the controller 30 may decrease the displacement of the variable displacement pump 32 in case the capacity of the accumulator 36 is about to be reached. When the accumulator 36 has reached its full capacity, the controller 30 may either reduce the displacement of the variable pump 32 to zero, or disengage the clutch 28 from the driveshaft 20.

The detection of the braking demand may be achieved in many different ways: electrically, electronically, hydraulically or pneumatically, at any convenient location on the braking system. For example, the braking demand sensor 31 may either be a rheostat connected to a brake pedal for electrically detecting the braking demand, or be a pressure sensor installed in the braking circuit (either pneumatic or hydraulic, depending on the type of braking fluid used).

A hydraulic variable displacement motor 38 is hydraulically connected to the accumulator 36. The motor 38 is operative to use, through pressurized hydraulic fluid, the energy received from the accumulator 36 and transform it into a rotational movement. Hence, the motor 38 is adapted to be mechanically connected to drive a mechanical device by this rotational movement, using the energy stored in the accumulator 36 in the form of pressurized hydraulic fluid. In the present embodiment, the motor 38 drives a fixed displacement pump 40, which is hydraulically connected to the auxiliary system 24 through an auxiliary hydraulic circuit 42. The motor 38 is sized according to the maximum torque required to provide sufficient power to the auxiliary system 24. It is advantageous to use two separate units as they may be separately sized for their specific torque requirements.

When the controller 30 detects a power demand from the auxiliary system 24, the controller 30 opens a valve 39 to send pressurized hydraulic fluid from the accumulator 36 to the motor 38. The controller then controls the displacement of the motor 38 to match the power demand. To detect the power demand from the auxiliary system 24, the controller 30 is connected to a power demand sensor 44, which detects the power demand by being connected either to the auxiliary system 24 or to the auxiliary hydraulic circuit 42. Similarly to the detection of the braking demand, the power demand may be detected in many different ways: electrically, electronically, hydraulically or pneumatically, at any convenient location on the auxiliary hydraulic circuit 42. In FIG. 1, the power demand sensor 44 is depicted as a fluid pressure sensor reading the pressure on the auxiliary hydraulic circuit 42.

For example, the power demand sensor 44 may either be a rheostat connected to a lever for electrically detecting the power demand, or be a pressure sensor installed in the auxiliary hydraulic circuit 42.

Many existing refuse trucks are already equipped with the auxiliary hydraulic pump 26. This auxiliary hydraulic pump 26, which may be similar to the fixed displacement pump 40, is driven by the internal combustion engine 14 and is mechanically connected to the engine-transmission assembly 18. The auxiliary hydraulic pump 26 is typically connected either to an engine crank, an engine flywheel, the transmission or a power take off (PTO). In FIG. 1, the auxiliary hydraulic pump 26 is shown mechanically connected to the engine flywheel. The auxiliary hydraulic pump 26 is used to pump hydraulic fluid to the auxiliary system 24, to which it is hydraulically connected. Since the auxiliary hydraulic pump 26 is always driven by the internal combustion engine 14, an unloading valve 46 is placed on the hydraulic connection line 25 between the auxiliary hydraulic pump 26 and the auxiliary system 24. This unloading valve 46 is used to divert the hydraulic fluid to the reservoir 34 when the fixed displacement pump 40 is active.

Since both the fixed displacement pump 40 and the auxiliary hydraulic pump 26 are connected to the auxiliary system 24, any of them, or both, may provide hydraulic power to the auxiliary system 24. Consequently, the objective is to decrease as much as possible the hydraulic power provided by the auxiliary pump 26 such that the load on the internal combustion engine 14 is decreased. As the load on the internal combustion engine 14 is decreased, less fuel is used. The controller 30 modulates the motor 38 so as to meet as much as possible the power demand from the auxiliary system 24. If the controller 30 is capable of fully meeting this power demand, then the internal combustion engine 14 sees no load from the auxiliary system 24. The auxiliary system 24 is then completely powered with the energy recovered from the braking of the vehicle. If the controller 30 is not capable of fully meeting this power demand because there is not sufficiently energy stored in the accumulator 36, the auxiliary hydraulic pump 26, driven by the internal combustion engine 14, makes up for the missing capacity.

Figure 2:
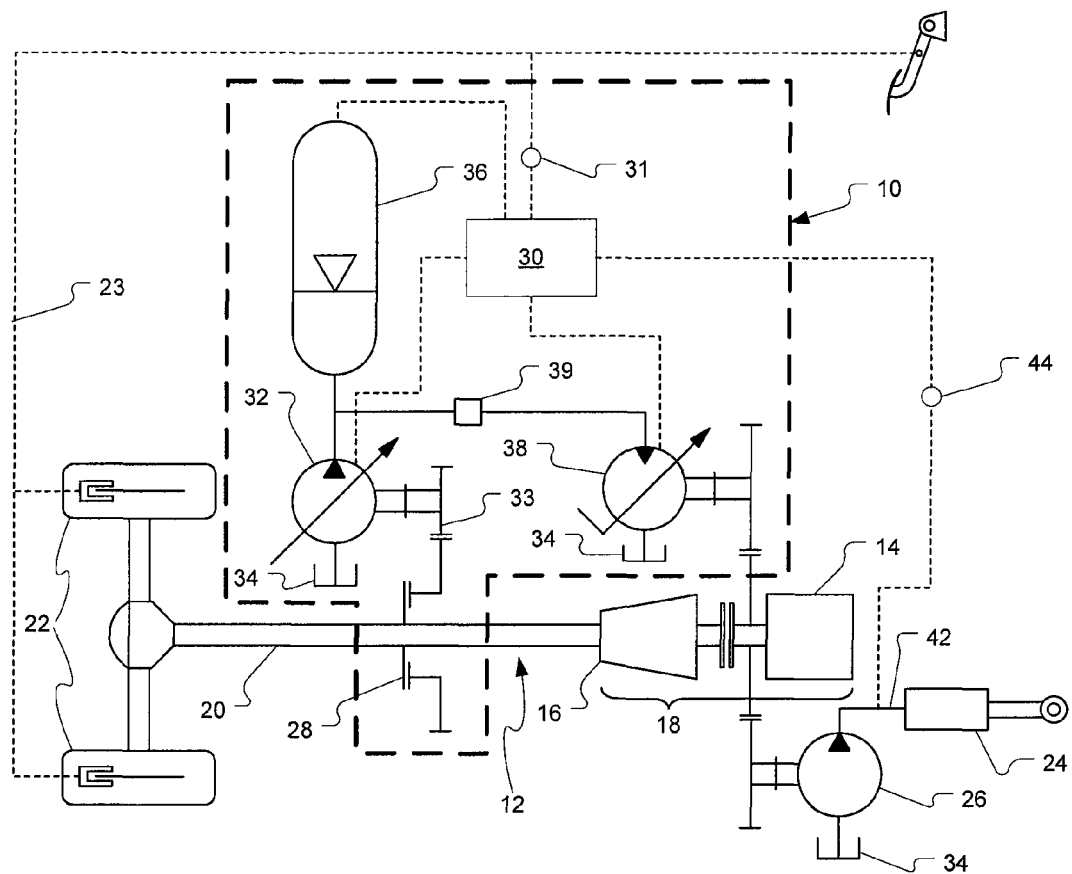
FIG. 2 is a schematic view of a braking energy recovery system in accordance with another embodiment of the present invention.

A second embodiment of the invention is now referred to in FIG. 2. This embodiment is similar to the embodiment already described except that the motor 38 is mechanically connected to the engine-transmission assembly 18 and the fixed displacement pump 40 is discarded. The motor 38 may be connected to the internal combustion engine 14 through the PTO or directly on the crankshaft or the flywheel of the internal combustion engine 14. Note that the motor 38 may be connected to the internal combustion engine 14 by a second clutch to allow disengaging the motor 38 when not required. Moreover, the auxiliary hydraulic pump 26 may be connected to the PTO, directly on the crankshaft or the flywheel of the internal combustion engine 14, or to any other convenient location. The auxiliary hydraulic pump 26, which may be a fixed or a variable displacement pump, may even be directly driven by the motor 38, the same way the fixed displacement pump 40 was driven by the motor 38 in the first embodiment of the invention.

When the controller 30 detects a power demand from the auxiliary system 24, it opens the valve 39 to feed the motor 38 with the pressurized hydraulic fluid stored in the accumulator 36. The motor 38 then drives the internal combustion engine 14, which also drives the auxiliary hydraulic pump 26. Again, depending on the level of power demand from the auxiliary system 24 and the level of energy stored in the accumulator 36, the controller modulates the displacement of the motor 38. If no sufficient energy is stored in the accumulator 36, then both the motor 38 and the internal combustion engine 14 drive the auxiliary hydraulic pump 26. If there is enough energy stored in the accumulator 36, then the load on the internal combustion engine 14 is reduced as only the motor 38 drives the auxiliary hydraulic pump 26. Hence, in these two cases, the auxiliary hydraulic pump 26 is at least partially driven by the motor 38. If there is no energy left in the accumulator 36, then the internal combustion engine 14 drives alone the auxiliary hydraulic pump 26. This last case is similar to the situation of a standard refuse truck that would not be equipped with a braking energy recovery system.

If the controller 30 assesses that the level of energy stored in the accumulator 36 is sufficient, it may decide to assist the internal combustion engine 14 by driving it. Whether the internal combustion engine 14 is accelerating, at a steady speed, or turning idle at the time of this assistance, the result is always a decrease in fuel consumption. This flexibility in the use of the stored energy is made possible because power is transferred from the motor 38 to the internal combustion engine 14. For example, the motor 38 may assist the internal combustion engine 14 during acceleration by also powering the wheel set 22 through an engine flywheel, reducing the load on the internal combustion engine 14. Another example would be that the motor 38 assists the internal combustion engine 14 to turn at idle speed rather than using fuel, as will be see in more details below.

When the braking energy recovery system 10 is installed as original equipment on a truck by its manufacturer, it is possible to have the controller 30 interface with the engine electronic control unit (ECU) so when the controller 30 intends to drive the internal combustion engine 14 solely on hydraulic energy stored, the ECU shuts off the fuel supply to the internal combustion engine 14 and the controller 30 adjusts the displacement of the variable displacement motor 38 so that the internal combustion engine 14 turns at its normal idle speed. However, when the braking energy recovery system 10 is retrofitted to an exiting truck, it may be advantageous not to have to fiddle with the existing ECU such that it can communicate with the controller 30. Hence, if the controller 30 assesses that sufficient energy resides in the accumulator 36 to drive the internal combustion engine 14 solely on hydraulic energy, it will adjust the displacement of the variable displacement motor 38 to drive the internal combustion engine 14 at a speed that is slightly above its normal idle speed. As the ECU decreases the fuel supply to the internal combustion engine 14 to lower its engine speed, it will lower the fuel supply until it completely shuts it off trying to still lower the engine speed to idle.

As an alternative to the previously described embodiments, the variable displacement pump 32 and the gearbox 33 may respectively be replaced by a fixed displacement pump and a continuously variable transmission. This also allows the control of the flow rate of hydraulic fluid pumped by the pump 32 to the accumulator 36 although this embodiment may arguably be more expensive to implement.

The present invention has been described with regard to preferred embodiments. The description as much as the drawings were intended to help the understanding of the invention, rather than to limit its scope. It will be apparent to one skilled in the art that various modifications may be made to the invention without departing from the scope of the invention as described herein, and such modifications are intended to be covered by the present description. The invention is defined by the claims that follow.

We claim:

1. A braking energy recovery system for use on a vehicle having a powertrain with a driving portion that includes an engine, and with a driven portion that includes a transmission and a driveshaft connecting the transmission to a wheelset, the driving portion of the powertrain being disengageably coupled to the driven portion, the braking energy recovery system comprising:

a first pump, being a variable displacement hydraulic pump, coupled to the driven portion of the powertrain;

a hydraulic accumulator connected to receive hydraulic fluid from the first pump, the accumulator being operative to store hydraulic fluid under pressure;

a hydraulic motor connected to receive hydraulic fluid from the accumulator, the hydraulic motor being isolated from the driven portion of the powertrain such that they can turn independently, the hydraulic motor also being coupled to the driving portion of the powertrain;

an auxiliary hydraulic system; and a second hydraulic pump adapted to power the auxiliary hydraulic system, the second hydraulic pump being coupled to the hydraulic motor, such that it can be operated by the hydraulic motor.

2. The braking energy recovery system of claim 1, wherein the second hydraulic pump is also coupled to the driving portion of the powertrain, such that the second hydraulic pump can also be operated by the driving portion of the powertrain.

3. The braking energy recovery system of claim 2, wherein the hydraulic motor is adapted to operate the second pump through the driving portion of the powertrain.

4. The braking energy recovery system of claim 1 wherein the hydraulic motor is adapted to apply a torque to turn the engine, the torque assisting the engine to accelerate, maintain a steady speed, turn idle, or power the auxiliary system.

5. The braking energy recovery system of claim 3, wherein the hydraulic motor is adapted to apply a torque to turn the engine, the torque assisting the engine to accelerate, maintain a steady speed, turn idle, or power the auxiliary system.

6. The braking energy recovery system claim 1, further comprising a clutch selectively engaging the first pump with the driveshaft, and a gearbox between the driveshaft and the first pump, the gearbox connecting the clutch to the first pump.

7. The braking energy recovery system of claim 1, further comprising a controller operative to detect a braking demand and to modulate the displacement of the first pump according to the braking demand.

8. The braking energy recovery system of claim 7, wherein the controller is further operative to modulate the displacement of the first pump according to the storage availability of the accumulator.

9. The braking energy recovery system of claim 7, wherein wherein the controller is further operative to detect an energy demand from the auxiliary hydraulic system and to modulate the displacement of the hydraulic motor according to the energy demand.

10. The braking energy recovery system of claim 7, wherein the hydraulic motor is coupled to the driving portion of the powertrain, and the controller is operative to adjust the displacement of the hydraulic motor to produce a torque capable of turning the engine.

11. The braking energy recovery system of claim 7, wherein the vehicle also has a base braking system, and wherein the controller is operative to activate and modulate the braking force of the base braking system according to the braking demand.

12. The braking energy recovery system of claim 1, wherein the maximum displacement of the first pump differs significantly from the displacement of the hydraulic motor.

13. The braking energy recovery system of claim 11, wherein the system is retrofitted to an existing vehicle having a transmission with multiple fixed gear ratios.

14. The braking energy recovery system of claim 5, wherein the system is retrofitted to an existing vehicle having a transmission with multiple fixed gear ratios.

15. The braking energy recovery system of claim 1, wherein the auxiliary hydraulic system is a piece of hydraulic equipment.

16. The braking energy recovery system of claim 15, wherein the piece of hydraulic equipment is a garbage compactor of a refuse truck.

17. The braking energy recovery system of claim 15, wherein the piece of hydraulic equipment is a hydraulic lifting arm of a refuse truck adapted to lift a garbage can.

* * * * *